May 10, 1966  J. F. CELLA ETAL  3,250,371
APPARATUS FOR TRANSFERRING ARTICLES
Filed June 29, 1964  3 Sheets-Sheet 3

INVENTORS
JOSEPH F. CELLA
DAVID M. GUIDI
BY GORDON L. BLISS
Burton & Parker
ATTORNEYS

United States Patent Office 3,250,371
Patented May 10, 1966

3,250,371
APPARATUS FOR TRANSFERRING ARTICLES
Joseph F. Cella, Northampton, David M. Guidi, Feeding Hills, and Gordon L. Bliss, Hampden, Mass., assignors to Cesco Containers Mfg. Corp., Northampton, Mass., a corporation of Massachusetts
Filed June 29, 1964, Ser. No. 378,495
11 Claims. (Cl. 198—21)

This invention relates to apparatus for assembling articles being delivered on an infeed conveyor into groups of a predetermined size and transferring the groups to an article supporting station for deposit in cases or like containers.

While suited for handling many articles, the apparatus has particular utility in the dairy industry to accept the output of a bottle filling machine and assemble the bottles into caseloads for deposit by a bottle packaging machine in cases or crates. The filled bottles from the filling machine are delivered in a single line to a position adjacent the packaging machine, where they must be assembled into caseloads for deposit in awaiting cases. Conventional apparatus for transferring the bottles comprises a reciprocable pusher operable to sweep one row of bottles at a time from the conveyor onto a bottle supporting table in the packaging machine. With such an arrangement, the pusher must operate once for each row of bottles to be transferred. For example, if the cases are adapted to contain three rows of bottles, the pusher must operate through three complete cycles to assemble a caseload of bottles in the packaging machine.

Assuming a delivery rate of 90 half-gallon milk bottles per minute, and a case capacity of six bottles in two rows of there bottles each, the pusher will be required to cycle thirty times per minute, or once every two seconds. This requires a high speed pusher which creates an appreciable impact against the bottles being pushed, resulting in the danger of breaking bottles.

The primary object of the invention is the provision of an apparatus for assembling and transferring groups of articles from a single line infeed conveyor to an article supporting station wherein there is provided at least one secondary conveyor and a pair of article transfer means, one of the transfer means being operable to transfer rows of articles to the secondary conveyor or conveyors for delivery along with articles on the primary conveyor to the other transfer means, which is then operable to transfer all of the rows of articles to the article supporting station of a packaging machine for delivery to an awaiting case. With such an apparatus, the transfer means operate at a much lesser speed than with prior art devices, and the impact against the bottles is reduced to a minimum.

A concomitant object is the provision of apparatus of the above character wherein the transfer means operate in unison with no delay in the cyclic operation of the entire apparatus.

A further object is the provision in such apparatus of adjustable means whereby the apparatus may be quickly and easily adjusted without change of parts to handle various sizes of articles such as milk bottles or the like.

Other objects, advantages and meritorious features will more fully appear from the specification, claims and accompanying drawings, wherein:

FIG. 5 is a schematic drawing of the electric control circuits of the mechanism shown in FIG. 1.

Figure 1:
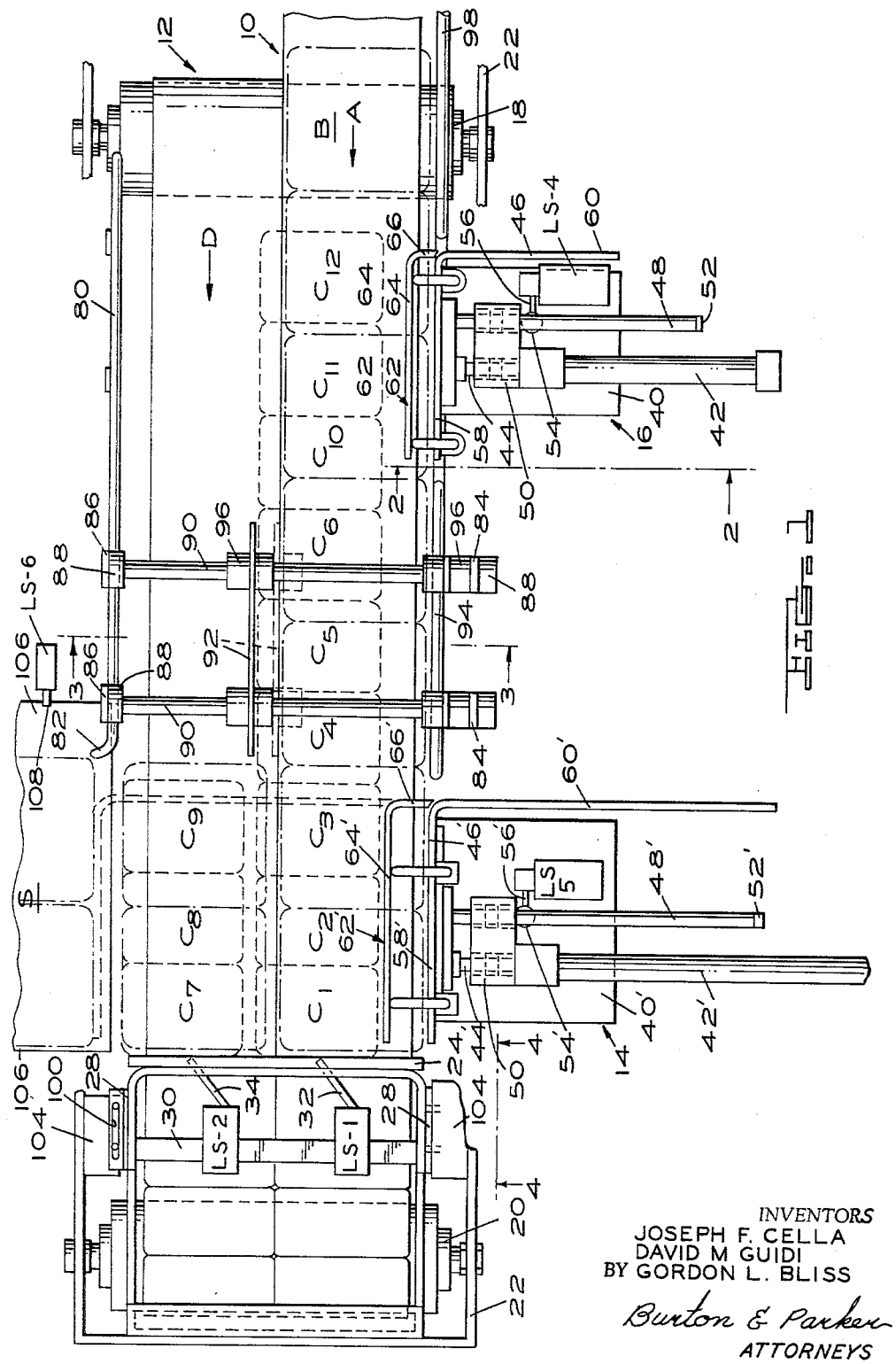
FIG. 1 is a top plan view of mechanism embodying the invention.

The embodiment of the invention shown in FIG. 1 in general comprises a primary article infeed conveyor 10, a secondary article conveyor 12, and a pair of article transfer means 14 and 16. As shown, the transfer means 14 and 16 are pushers which are operable to sweep articles from the conveyors, and for convenience of reference, the transfer means 14 will be referred to as the main pusher, while 16 will be referred to as the divider pusher. The two conveyors 10 and 12 may each comprise conventional link-belt article-supporting spans entrained over suitable pulleys 18 and 20 driven by an electric motor or the like (not shown) and supported in any convenient fashion on the conveyor frame generally indicated at 22.

Filled bottles are delivered along conveyor 10 from a filling machine in the direction of the arrow A in FIG. 1 into the area in front of the transfer means 14 and 16, whereat the secondary conveyor 12 runs immediately adjacent and parallel to conveyor 10. Extending across the downstream ends of the conveyors is an article stop fence 24 affixed to a supporting bracket 26 which is adjustably supported on a pair of plates 28 for purposes more fully explained hereinafter. Bracket 26 carries a support 30 upon which are mounted switches LS-1 and LS-2 having switch arms 32 and 34 respectively, projecting through stop fence or plate 24. As shown, the apparatus is designed to handle either gallon bottles B shown in phantom or half-gallon bottles C shown in dotted lines in FIG. 1. The switches LS-1 and LS-2 are of conventional construction and are schematically shown in FIG. 5 and need not be further described.

Pushers 14 and 16 are identical in construction except that they may be of slightly different sizes, and therefore a description of divider pusher 16 will suffice for both. Similar parts of main pusher 14 are indicated by the same numerals primed. Pusher 16 is mounted on a base plate 40 and includes a fluid pressure cylinder 42 having a piston rod 44 connected to a generally L-shaped pusher bar 46. Extending rearwardly from the pusher bar is a combination guide and switch-operating rod 48. Rod 48 and cylinder 42 are supported by a block 50, with rod 48 extending through the block to prevent pivoting of bar 46 upon its connection with the piston rod 44. The rear end of rod 48 has an enlargement 52 adapted to engage roller 54 mounted on the switch-actuating arm 56 of a switch mounted on the base plate 40. Switch LS-4 is for controlling the divider pusher 16 and switch LS-5 is for controlling main pusher 14, as shown in FIG. 1. The L-shaped pusher 16 has a front face 58 engageable with the bottles to sweep them from conveyor 10 onto conveyor 12, and a rearwardly extending portion 60 which serves to block entry of more bottles in front of the pusher when in its extended position.

Pusher 14 is reciprocable across both conveyors 10 and 12 to an extended position shown in dotted outline in FIG. 1, and operates to sweep articles therefrom into a supporting station S only partially shown. Pusher 16 on the other hand has a shorter strike, it being operable to sweep articles from conveyor 10 onto conveyor 12 for movement in the direction of arrow D in FIG. 1 to a position in front of main pusher 14 for subsequent transfer by such pusher.

Figure 2:
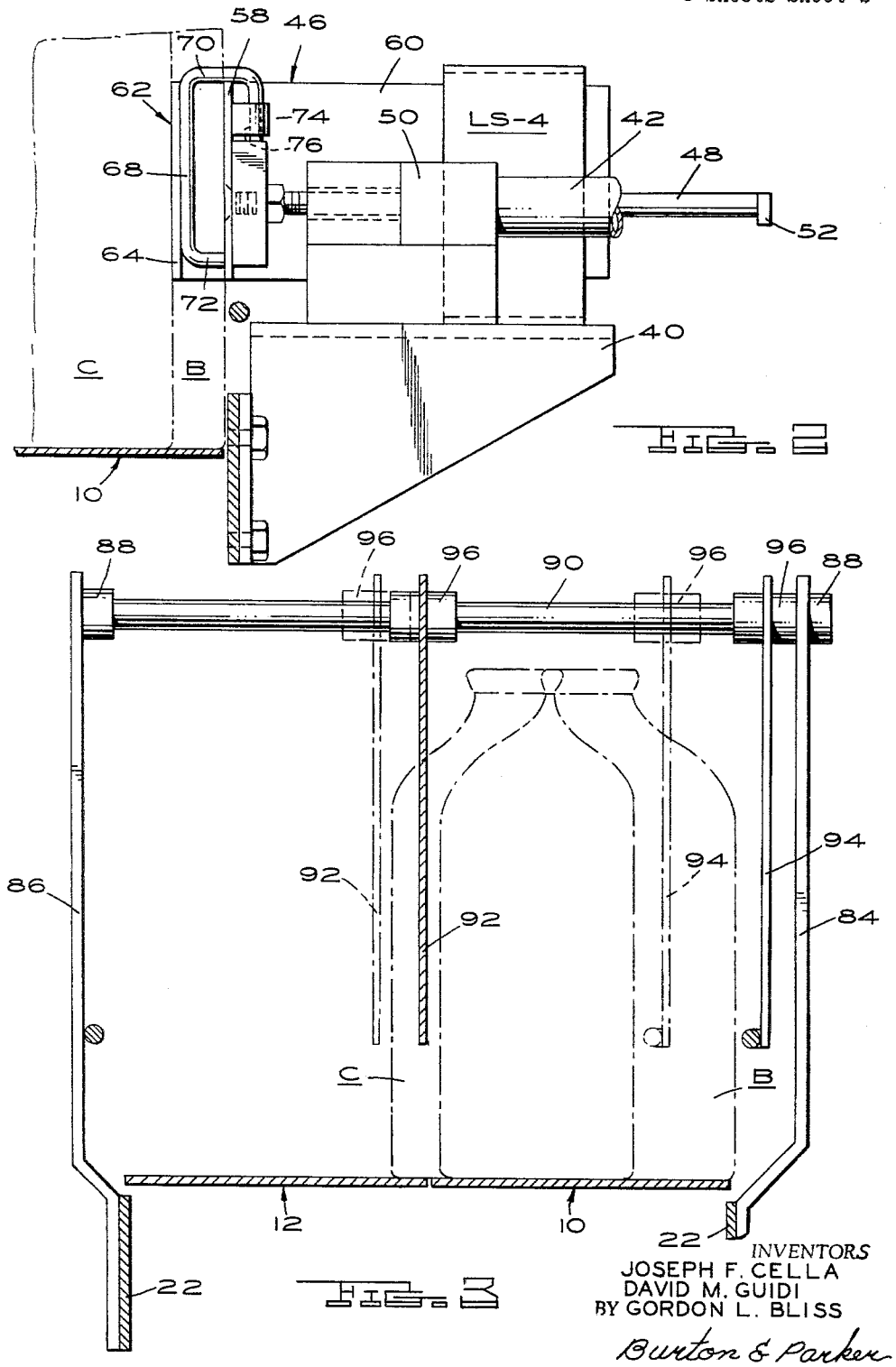
FIG. 2 is a side elevation, partly in section, taken along line 2—2 of FIG. 1 showing the divider pusher and its adjustable feature.

The pushers 14 and 16 are each provided with removable extensions to accommodate the different size bottles shown in FIG. 1, i.e., gallon bottles B and half-gallon bottles C. Pusher extension 62 of divider pusher 16, shown in FIGS. 1 and 2, comprises a plate-like portion 64 engageable with the bottles, and a rearwardly projecting portion 66 terminating adjacent the pusher bar 46. Secured to the rear face of plate 64 as by welding or the like are a pair of holders 68, each having an upper end 70 of inverted U-shape and a lower end 72. Secured to the rear face of pusher bar face 58 are a pair of brackets 74, each with an aperture 76 there through. To removably attach the extension 62 to the pusher bar 46, the free end of U-shaped portion 70 of holders 68 are inserted into the apertures 76, with the bight of the U-shape resting upon the top of plate 58, and with the lower end 72 of the holders 68 bearing against the front face of plate 58, as shown in FIG. 2. The extension 68' of pusher 14 is substantially identical and is assembled on its pusher bar in the same manner.

Figure 3:
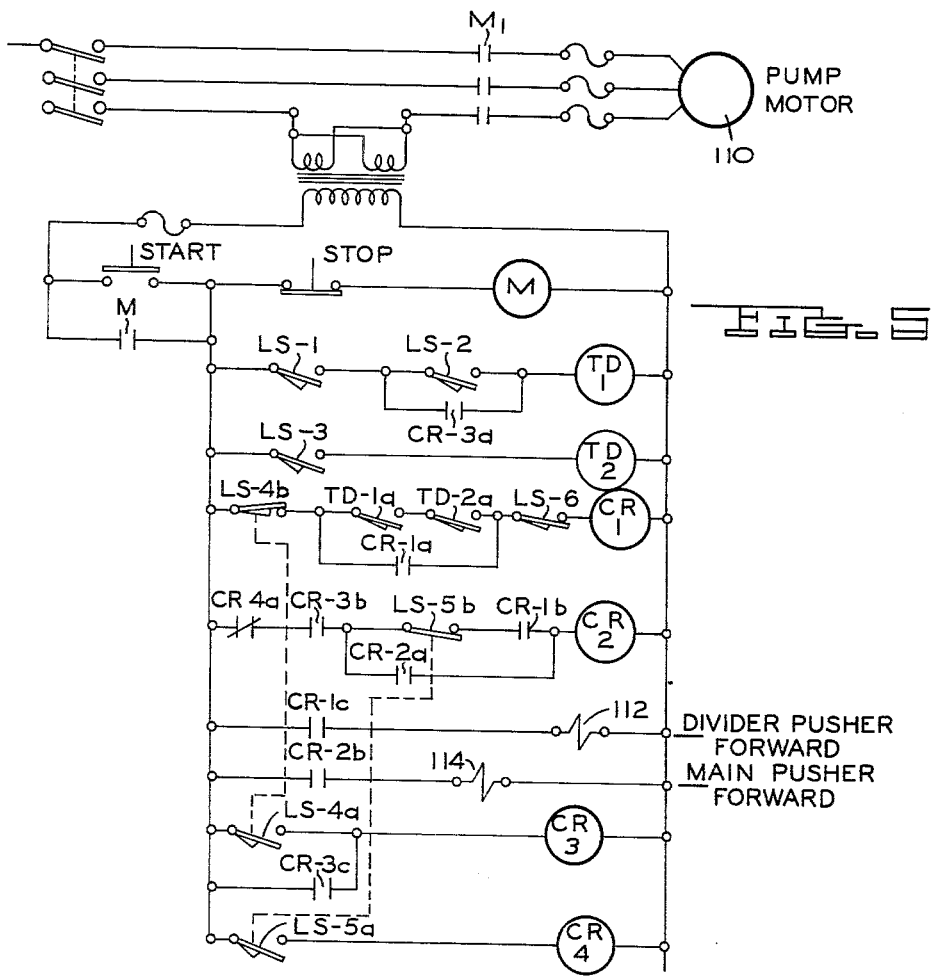
FIG. 3 is a cross-sectional view taken along line 3—3 of FIG. 1 showing the adjustable guide plates adapted to be positioned between the rows of bottles.

Also provided to accommodate the different size bottles, are guide rails and divider plates shown in FIGS. 1 and 3. A fixed outer guide rail 80 extends along the side of conveyor 12 opposite the pushers 14 and 16 and terminates in a curved end 82 adjacent supporting station S to guide bottles into the station. Affixed to a part of the conveyor frame 22 on opposite sides of the conveyors in any convenient fashion as by welding, are the support brackets 84 and 86, having sleeve-like members 88 at their upper ends within which are received support bars 90 extending transversely across conveyors 10 and 12 at a height sufficient to permit the bottles to pass thereunder. Depending from each bar 90 is a divider plate 92 and an inner guide rail 94, each of which have a tubular portion 96 adjacent their upper ends for slidably adjustable movement along the bar 90. As shown in FIG. 3, the divider plate 92 and inner guide rail 94 are positioned as shown in solid outline to accommodate the gallon bottles B, and are slid along the bars 90 to the position shown in phantom outline to accommodate the half-gallon bottles C. Conveyor 10 is also provided with guide rails upstream of divider pusher 16, one of which rails is shown partially at 98 in FIG. 1.

Figure 4:
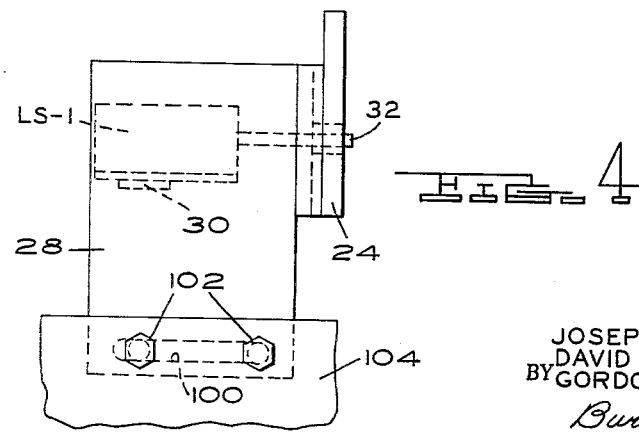
FIG. 4 is a cross-sectional view taken along line 4—4 of FIG. 1 showing the adjustable stop fence at the downstream end of the conveyors.

The stop fence 24 and its associated supports including switches LS-1 and LS-2 are also adjustably mounted to accommodate the various size bottles. As shown in FIGS. 1 and 4, the plates 28 are each provided with a slot 100 through which bolts or the like 102 project to secure the plates to blocks 104 which are a part of the conveyor frame 22. Thus the stop fence assembly may be shifted slightly with respect to the conveyor frame 22 to insure proper alignment of the bottles B or C with the pushers 14 and 16.

In general the operation of the mechanism shown in FIG. 1 is as follows: Prior to energization, both pushers 14 and 16 are in their retracted positions. For convenience of reference, the description will assume throughout that half-gallon bottles C are to be handled, and therefore pusher extensions 62 and 62' will be used, and stop fence 24, divider plate 92 and inner guide rail 94 will be positioned as above described to accommodate the half-gallon size bottles. Although not shown in FIG. 1, there is disposed adjacent conveyor 10 upstream of pusher 16, a so-called back-log switch which is operable to sense the presence on conveyor 10 of a full line of bottles. Such switch is shown schematically in FIG. 5 and is labeled LS-3, and is spaced upstream of pusher 16 a distance to a case row of bottles plus two.

As the bottles C are delivered on conveyor 10, the lead bottle abuts stop fence 24, moving switch arm 32 to close switch LS-1, which will on the initial cycle of operation cause actuation of divider pusher 16 to sweep three bottles C from conveyor 10 onto conveyor 12. By the time these bottles on conveyor 12 reach stop fence 24 and move switch arm 34 to close switch LS-2, three more bottles will have moved along conveyor 10 in front of pusher 16, assuming a sufficient feed of bottles from the filling machine. With backlog switch LS-3 held closed by a solid line of bottles extending upstream of pusher 16, and with switches LS-1 and LS-2 held closed, both the pushers 14 and 16 will operate simultaneously, main pusher 14 sweeping a caseload of bottles C into the supporting station S while divider pusher 16 sweeps another case row of bottles onto conveyor 12. The following cycles of operation are similar, with the pushers 14 and 16 operating simultaneously upon the closing of switches LS-1 and LS-2 at the downstream end of conveyors 10 and 12 and the closing of backlog switch LS-3 upstream of the pusher 16. Main pusher 14 is caused to retract when the abutment 52' on the rod 48' trips switch LS-5 by contacting roller 54' to shift actuating arm 56'. Similarly, pusher 16 retracts when abutment 52 on rod 48 strikes roller 54 to move switch arm 56 of switch LS-4. Thus both pushers retract with no delay in the cycle of operation.

Bottle supporting station S comprises a flat table 106 (FIG. 1) upon which the caseload of bottles rests until picked up by the bottle packaging machine carrier (not shown), which may be constructed as disclosed in U.S. Patent 2,957,287. As described in such patent, when the carrier has picked up the bottles, table 106 retracts to the right as shown in FIG. 1 to allow the carrier and bottles to descend into a waiting case or crate (not shown). A switch LS-6 having a switch arm 108 is tripped upon retraction of table 106, preventing pusher 14 from sweeping bottles into station S when the table is retracted out of bottle-receiving position.

The system for controlling the automatic operation of the apparatus is schematically shown in FIG. 5. An electric motor 110 driving a fluid pressure pump (not shown) is connected in series with relay contacts $M_1$ of the motor relay M so that upon depression of the start button, motor 110, is energized. The fluid pressure pump connected to the motor is communicatively coupled in any desired arrangement to the fluid pressure cylinders above described with the communication controlled by solenoid-operated valves. For the cylinders 42 and 42' of pushers 14 and 16, solenoids 112 and 114 respectively are suitably connected to valves in the fluid pressure circuit so that upon energization of a solenoid the valve is shifted to cause pressurization or depressurization of the cylinder. For example, energization of solenoid 112 shifts its associated valve to admit fluid pressure to cylinder 42 of pusher 16, causing the pusher to extend, and de-energization of the solenoid permits the valve to be spring-returned to a position admitting fluid pressure to the opposite end of cylinder 42 to retract the pusher. Solenoid 114 controls pusher 14 in identical fashion.

Considering the control circuit of FIG. 5 in detail, relay M closes the relay contacts $M_1$ to start the motor and also closes contacts $M_2$ to keep the motor running when the start button is released and to allow energization of the control circuits hereinafter described. Prior to delivery of bottles along conveyor 10 the switches are in their positions shown in FIG. 5. With delivery of bottles on conveyor 10, the initial cycle of the control circuits is as follows: The lead bottle in the row on the conveyor 10 strikes switch arm 32, closing switch LS-1 which on the initial cycle only, as relay contacts $CR3_a$ are closed, energizes time delay relay TD-1. If sufficient bottles have accumulated on the conveyor, they serve to hold backlog switnh LS-3 closed too, energizing time delay relay TD-2.

With the expiration of a time interval as determined by the settings of TD-1 and TD-2, their associated contacts $TD1_a$ and $TD2_a$ will close. Switch contacts $LS4_a$ are open and $LS4_b$ are closed, as divider pusher 16 is in its retracted position. Switch LS-6 is also closed, assuming table 106 is in its extended position to receive bottles. With these contacts and switches closed, relay CR-1 is energized, closing relay contacts $CR1_c$ to energize solenoid 112. Energization of solenoid 112 shifts its associated valve to the position admitting fluid pressure to cylinder 42 of pusher 16 (see FIG. 1), extending the pusher to sweep the three half-gallone bottles from conveyor 10 to conveyor 12. When the pusher reaches the outer limit of its stroke, projection 52 actuates switch LS–4, closing switch contacts LS4$_a$ to energize relay CR3 and opening contacts LS4$_b$ to de-energize relay CR1. Energization of relay CR3 opens contacts CR3$_a$ to prevent by-passing of switch LS–2 on successive cycles of operation, closes contacts CR3$_b$ to permit energization of relay CR–2 as hereinafter described, and closes contacts CR3$_c$ to lock in relay CR3 by-passing switch contacts LS4$_a$. Thus after the initial cycle of pusher 16, LS4$_a$ is rendered inoperative, and CR3 remains energized throughout the remainder of the operating run. The bottles transferred by pusher 16 on its initial stroke move along conveyor 12 to a position in front of pusher 14 where they are shown at $C_7$, $C_8$ and $C_9$ in FIG. 1.

After the above-described initial cycle, the control circuit operates to control the mechanism repetitively as follows: The three bottles $C_7$, $C_8$ and $C_9$ pushed on the initial stroke of pusher 16 come against stop fence 24, and three more bottles $C_{10}$, $C_{11}$ and $C_{12}$ move along conveyor 10 in front of pusher 16 as shown in FIG. 1. The original bottles $C_1$, $C_2$ and $C_3$ are still in front of pusher 14, and it is to be noted that the pusher 14 and 16 are spaced apart a distance to accommodate an additional case row of bottles, in this example three, $C_4$, $C_5$ and $C_6$, in between the pushers. Bottle $C_1$ has held LS–1 closed, and bottle $C_7$ closes LS–2, and assuming backlog switch LS–3 is held closed by an accumulation of bottles, TD–1 and TD–2 will serve to energize CR–1 and CR–2, assuming switch contacts LS4$_b$ and LS5$_b$ are closed by the pushers being in retracted position. It will be observed too, that if switch LS–6 is not closed by table 106 being in bottle receiving position, relay CR–1 cannot be energized, nor can relay CR–2, as it is controlled by normally open relay contacts CR1$_b$. If LS–6 is closed, energization of CR1 and CR2 closes contacts CR1$_c$ and CR2$_b$, energizing solenoids 112 and 114. When the solenoids are energized, the pushers 14 and 16 operate substantially simultaneously as above described with reference to pusher 16.

As the pushers reach the outer limit of their stroke, switch contacts LS5$_a$ are opened to energize relay CR4 and open contacts CR4$_a$, and contacts LS4$_b$ are opened. This de-energizes relays CR1 and CR2 to in turn de-energize solenoids 112 and 114 whereby the pushers are retracted. On its forward sweep, pusher 14 has transferred bottles $C_1$, $C_2$, $C_3$, $C_7$, $C_8$ and $C_9$ into area S, table 106 for subsequent transfer therefrom by the bottle packaging matchine. Pusher 16 has simultaneously transferred another row of bottles $C_{10}$, $C_{11}$ and $C_{12}$ onto conveyor 12. When the pushers retract, bottles $C_4$, $C_5$ and $C_6$ move along conveyor 10 in front of pusher 14, and bottles $C_{10}$, $C_{11}$ and $C_{12}$ move along conveyor 12 in front of pusher 14, while at the same time conveyor 10 has delivered more bottles to form a solid line on conveyor 10 extending upstream of pusher 16.

Thus it can be seen that after the initial cycle of pusher 16 alone to set up a full caseload of bottles in front of pusher 14, each successive operation of the apparatus serves to transfer an entire caseload of bottles to the supporting station S of the bottle packaging machine and substantially simultaneously transfers another row of bottles from conveyor 10 to conveyor 12 to provide the next successive caseload. With the example given, the main pusher 14 operates only once for each caseload of bottles, instead of twice, and therefore it can operate at a slower rate, greatly reducing the impact on the bottles and practically obviating bottle breakage, while appreciably prolonging the life of the mechanism itself. The divider pusher 16 also operates only once per each caseload, and hence the same advantages hold true for it also.

While the above description has been restricted to a system of only two conveyors, and hence two rows of bottles per caseload, it will be apparent to those skilled in the art that the system may be expanded to provide for handling three or more rows of bottles per case so that the main pusher will be required to operate only once for each caseload of bottles.

What is claimed is:

1. Apparatus for the purpose described comprising: a primary article infeed conveyor along which articles are delivered; at least one secondary article infeed conveyor adjacent said primary conveyor; an article supporting station in article receiving relation with said conveyors; first article transfer means for transferring articles from said conveyors to said article supporting station, and responsive to a predetermined accumulation of articles on each of said conveyors to transfer articles therefrom to said article supporting station; and second article transfer means spaced upstream from said first transfer means for transferring articles from the primary conveyor to the secondary conveyor and responsive to a predetermined accumulation of articles on said primary conveyor to transfer articles therefrom to the secondary conveyor.

2. Article transfer apparatus for the purpose described comprising: a primary article infeed conveyor along which articles are delivered; at least one secondary article infeed conveyor extending adjacent and parallel to said primary conveyor; an article supporting station in article receiving relation with said conveyors; article stop means extending across the downstream end of said conveyors; first article transfer means operable to transfer articles from said conveyors to said supporting station; second article transfer means spaced upstream from said first transfer means operable to transfer articles from said primary conveyor to said secondary conveyor; and control means responsive to a predetermined accumulation of articles on said primary conveyor and to the presence of articles adjacent said stop means on said secondary conveyor to cause said first and second transfer means to transfer said articles substantially simultaneously.

3. Apparatus for transferring articles for the purpose described comprising: a primary article infeed conveyor along which articles are delivered; a secondary article infeed conveyor extending adjacent and parallel to said primary conveyor for delivering articles; article stop means extending transversely across both of said conveyors at the downstream ends thereof; an article supporting station positioned laterally adjacent one side of said conveyors at the downstream end and in article receiving relation therewith; first article transfer means positioned adjacent the side of said conveyors opposite said article supporting station operable to transfer articles from both conveyors to said supporting station; second article transfer means positioned adjacent said primary conveyor spaced upstream from said first transfer means operable to transfer articles from said primary conveyor to said secondary conveyor; and control means coupled to each of said transfer means responsive to a predetermined accumulation of articles on each of said conveyors to cause said transfer to operate substantially simultaneously.

4. Apparatus for the purpose described comprising: a primary article infeed conveyor along which articles are delivered; a secondary article infeed conveyor extending adjacent and parallel to said first conveyor; first article transfer means adjacent the downstream end of said conveyors operable to transfer articles from both of said conveyors substantially simultaneously; second article transfer means positioned adjacent said primary conveyor spaced upstream from said first transfer means operable to transfer articles from said primary conveyor to said secondary conveyor; and a control system coupled to both of said transfer means responsive to a predetermined accumulation of articles on said primary conveyor only to actuate said second transfer means to transfer articles from said primary conveyor to said secondary conveyor, and further responsive to the simultaneous presence of a predetermined accumulation of articles on said primary conveyor and the presence of articles on said secondary conveyor in front of said primary transfer means to actuate both of said transfer means substantially simultaneously.

5. Apparatus for transferring articles for the purpose described comprising: a primary article infeed conveyor along which articles are delivered; a secondary article infeed conveyor positioned adjacent and parallel to said primary conveyor for delivering articles; article stop means extending transversely across both of said conveyors at the downstream end thereof; an article supporting station disposed in article receiving relation with said conveyors positioned laterally adjacent the downstream end of the conveyors; first article transfer means adjacent the downstream end of said conveyors on the side thereof opposite said supporting station mounted for movement laterally across the downstream end of said conveyors to sweep articles therefrom into said article supporting station; second article transfer means positioned adjacent said primary conveyor spaced upstream from said first article transfer means for movement laterally across said primary conveyor to transfer articles therefrom to said secondary conveyor; and control means coupled to both of said transfer means and responsive to the predetermined accumulation of articles on said primary conveyor to actuate said second transfer means, and further responsive to the simultaneous presence of such predetermined accumulation of articles on said primary conveyor and the presence of articles adjacent said stop means on the secondary conveyor to actuate both of said transfer means substantially simultaneously.

6. The invention as defined in claim 5 characterized in that said first transfer means and said second transfer means are operable to transfer identical number of articles from said primary conveyor, and said transfer means are spaced apart along said primary conveyor a distance sufficient to accommodate therebetween a number of articles equal to the number transferred by one of said transfer means.

7. The invention as defined in claim 5 characterized in that said article supporting station is shiftable to a second position out of article receiving relation with said conveyors, and said control means includes a part responsive to the presence of said article supporting station in said second position and coupled to said transfer means to prevent actuation of the transfer means irrespective of the accumulation of articles on said conveyors when said supporting station is in said second position.

8. Apparatus for transferring articles for the purpose described comprising: a primary article infeed conveyor along which said articles are delivered; a secondary article infeed conveyor extending adjacent and parallel to said primary conveyor for delivering articles; an article supporting table normally positioned in article receiving relation with said conveyors laterally adjacent the downstream ends thereof; an article stop fence extending transversely across the downstream ends of said conveyors; a first article pusher positioned adjacent said conveyors on the side thereof opposite said supporting table for reciprocable movement laterally across the conveyors to sweep articles therefrom onto the table; a second article pusher positioned adjacent said primary conveyor spaced upstream of said first pusher for reciprocable movement laterally across the primary conveyor to sweep articles therefrom onto said secondary conveyor; motive means coupled to each of said pushers to reciprocate the pushers; and a control circuit coupled to each of said motive means, said circuit including first and second switch means positioned respectively at the downstream end of said primary and secondary conveyors and actuated by articles on the conveyors abutting said stop fence, and third switch means positioned along the primary conveyor spaced upstream of the second pusher actuated by a solid line of articles on said conveyor, said control circuit being operable upon the actuation of all three of said switch means to energize said motive means and cause said pushers to operate substantially simultaneously.

9. In article transfer apparatus of the character described capable of transferring articles of various sizes, a primary conveyor along which articles are delivered; a secondary conveyor adjacent the primary conveyor and extending parallel thereto; first article transfer means adjacent the downstream end of said conveyors for transferring articles therefrom; second article transfer means spaced upstream from said first transfer means adjacent the primary conveyor for transferring articles therefrom to the secondary conveyor; divider means suspended above said conveyors projecting between articles on said primary conveyor and articles on the secondary conveyor intermediate the first and second transfer means to keep such articles segregated on their respective conveyors, said divider means being adjustable transversely of the conveyors to accommodate articles of various sizes.

10. The invention as defined in claim 9 characterized in that said divider means includes support members extending transversely across the conveyors spaced thereabove, and plate-like guides suspended from the support members extending longitudinally of conveyor movement, with said guides being adjustable along the supports.

11. The invention as defined in claim 9 characterized in that each of said transfer means comprises a reciprocable pusher having an upright wall portion shiftable transversely across the conveyors to sweep said articles, each of said pushers having a plate-like member adapted to be removably mounted on the pusher in spaced parallel relation with said wall means to accommodate articles of various sizes without changing the stroke of the pusher.

References Cited by the Examiner

UNITED STATES PATENTS 2,649,231   8/1953   Ferguson _____ 198—31 X

SAMUEL F. COLEMAN, *Primary Examiner.*

EDWARD A. SROKA, *Assistant Examiner.*